Oct. 11, 1955           J. A. HERD           2,720,605
COIL SUPPORT FOR DYNAMO-ELECTRIC MACHINES
Filed June 17, 1954           2 Sheets-Sheet 1
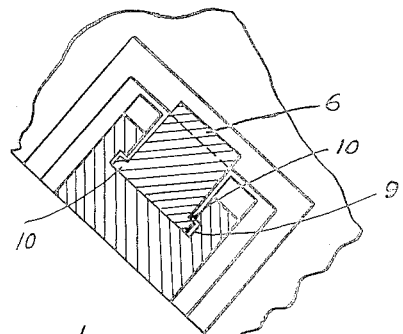
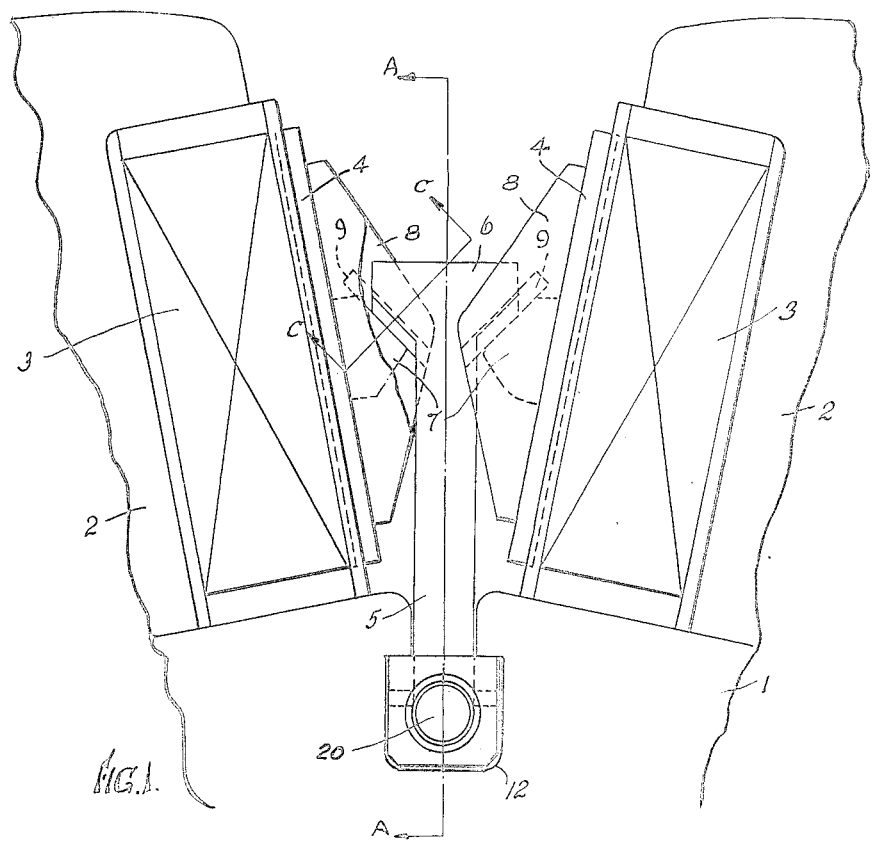
INVENTOR
JOHN ALBERT HERD,
BY
ATTORNEY

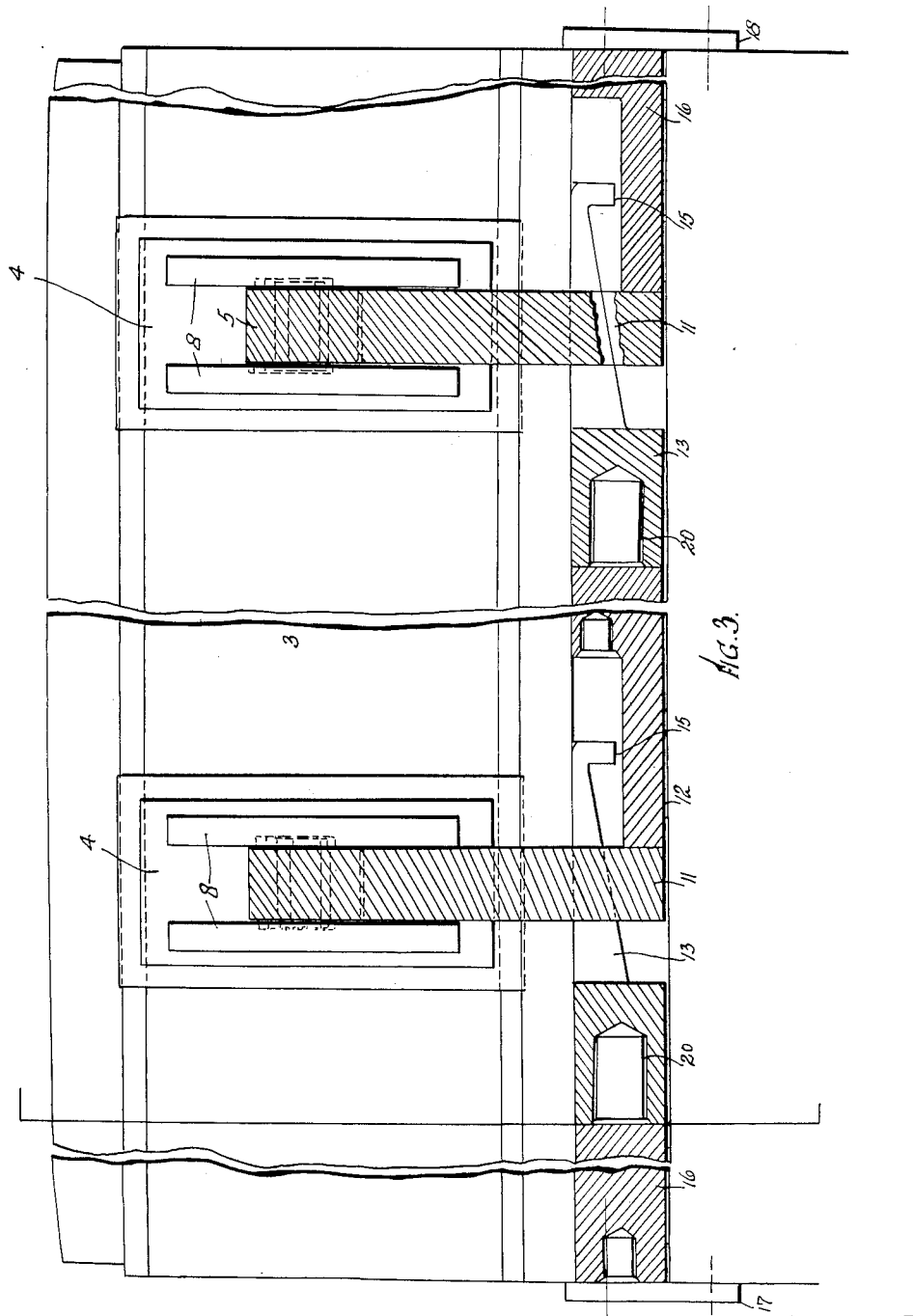

United States Patent Office 2,720,605
Patented Oct. 11, 1955

2,720,605

COIL SUPPORT FOR DYNAMO-ELECTRIC MACHINES

John Albert Herd, Rugby, England, assignor to The British Thomson-Houston Company Limited, a British company Application June 17, 1954, Serial No. 437,430

Claims priority, application Great Britain June 26, 1953

1 Claim. (Cl. 310—194)

This invention relates to the securing of field coils to the salient poles on rotors of dynamo-electric machines.

The field coils of salient pole rotors for dynamo-electric machines are usually in the form of edgewise wound strips of high conductivity metal, e. g. copper, and, in the case of high speed machines, in order to prevent the coils from bowing outwardly under the influence of centrifugal force, wedge-shaped members are customarily inserted between, to exert tangential pressure against, the opposing faces of adjacent coil sides, the wedge-shaped members being held in place by bolts which pass through the wedge-shaped members and are screwed into the body of the rotor.

It is sometimes desirable, particularly in the case of a machine operating with its rotor axis vertical, to be able to remove one or more stator coils without completely dismantling the machine. This can only be done, however, if one or more poles are withdrawn from the rotor body leaving a space between the outer surface of the rotor body and the inner periphery of the stator. It is thus necessary first to remove a field coil from a selected pole, or from two or more adjacent poles, and unless the wedge-shaped member located between the coil on the selected pole and its adjacent pole can first be withdrawn, it is impossible to remove the field coil without removing the rotor from the stator or vice versa. However, the presence of the securing bolts for the wedge-shaped members, which bolts are not withdrawable from the rotor while it is within the surrounding stator, normally renders the removal of the wedge-shaped members impracticable while the rotor is in position within the stator.

The object of the invention is to provide a construction which avoids this disadvantage.

According to the invention an expandible connection between pressure members abutting against the adjacent faces of the coils, and means acting radially inwardly of the rotor and operable by a wedging device movable axially of the rotor being employed for expanding the connection and creating pressure between the coils.

The expandible connection can be in the form of a toggle comprising links connected each to one of the pressure members and having a common pivotal connection, the common pivotal connection being connected to the means acting radially inwardly of the rotor, so that the length of the toggle can be increased to provide the requisite expansion. Alternatively, we may employ a wedge-shaped member which is expandible only by virtue of its being moved radially inwardly to a position on the rotor of lesser circumferential length relative to the axis of the rotor and to its initial position.

In a further alternative, the separate pressure members may be replaced by a single wedge-shaped member which, when moved radially inwardly by the means acting radially inwardly of the rotor, itself serves as an expandible connection by virtue of its movement from an initial position between the coils to a second position of lesser circumferential length relatively to the rotor axis.

The means acting radially inwardly of the rotor for expanding the connection between the pressure members may consist of a bar, one end of which is formed with a T-head entering into an axial slot in the rotor body, the axial slot receiving a key of wedge-shaped form which, when moved axially of the rotor, acts against the outer surface of the T-head to draw the bar radially inwardly of the rotor. The bar is then connected at its outer end to the common pivot of the toggle, or is formed with a wedge-shaped head adapted to engage taper surfaces on the pressure members so as to expand the pressure members, or to move the wedge-shaped member, towards the faces of the adjacent coils when the bar is moved radially inwardly. The axial movement of the key may be effected by a screw or other convenient device.

In order that the invention may be more readily understood, reference will now be directed to the accompanying drawings which show a preferred arrangement for carrying it into effect.

In the drawings, Fig. 1 is an end view of a pair of adjacent salient poles on the rotor showing the application of the pressure members between the faces of adjacent coils; Fig. 2 is a section on the line C—C of Fig. 1; and Fig. 3 is a longitudinal section of a part of the rotor showing the means whereby the radially inward movement of the bars for operating the expandible connection is effected.

Referring to the drawings, 1 indicates the body of the rotor to which salient poles 2 are connected in any convenient known manner. Field coils 3 are wound on the salient poles, the coils being in the form of flat strip edgewise wound around the poles. Adjacent faces of the coils 3 are engaged by the faces of pressure members 4 which are associated with an expandible connection in the form of a bar 5 having a wedge-shaped head 6, the lower taper faces of which engage corresponding tapered faces on a central block 7 on pressure members 4. The pressure members are provided with flanks 8 which are joined by the central block 7, the flanks having grooves 9 which, as shown in Fig. 2, are entered by projections 10 on the taper sides of the wedge-shaped head 6 of the bar 5. The projections 10 and grooves 9 serve to make captive the pressure members 4 on the bar 5. The expansion of the pressure members 4 towards the adjacent faces of the field coils is effected by moving the bar 5 radially inwardly so that the sloping faces of the head 6 of the bar provide the expandible connection.

The bar 5 is made with a T-head 11 movable in a groove 12 in the rotor body 1. It is thus retained in the groove 12 and can be moved radially inwardly by the application, in the axial direction of the rotor, of a wedge 13 which engages the T-head 11 at the lower end of the bar 5. The wedge member 13 is provided with a turned down head 15 for preventing it from being axially displaced from the T-head 11. Wedge 13 is movable axially of the groove 12 and bears on a taper surface on the T-head 11 and on the outer surface of the groove 12.

Two pairs of pressure members are employed in the arrangement shown in Fig. 3 displaced axially of the rotor, the axial position of each pair being controlled by packing pieces 16 located in the groove 12 so that the inner end of the right-hand bar 5 is forced against a packing 16 when the wedge 13 is driven home. When using two or more pairs of pressure members the axial position of each pair may be controlled by measuring the length of packing 16 required between the first and second pair of pressure members after the first wedge 13 has been driven home. The packing 16 and wedges 13 are finally secured from movement by retaining plates 17, 18 at each end of the groove 12.

The pressure members are radially dismountable by removing the retaining plate 17, withdrawing the final packing 19 so as to uncover a tapped hole 20 in the end of the adjacent wedge 13 and withdrawing the wedge by inserting a stud in the hole 20. When the wedge 13 is withdrawn the head 15 at the end of the wedge engages the bar 5 and facilitates the axial withdrawal of the bar and pressure members.

It will be seen that the arrangement described provides a ready means for the removal of the pressure members and the subsequent removal of the poles and field coils for servicing.

What I claim as new and desire to secure by Letters Patent of the United States is:

In a dynamo-electric machine, the combination with a rotor having salient poles secured thereto, said poles having windings thereon, of means for preventing the displacement of said windings on said poles as a result of centrifugal force comprising pressure members engaging the opposed faces of said coils between adjacent poles, a projection on each of said pressure members having a taper base and furnished with flanks provided with grooves, a bar having a head provided with opposed tapered faces adapted to co-operate with the tapered faces on said projections on pressure members engaging the opposed faces of coils on adjacent poles, said head being furnished with projections which enter said grooves whereby said pressure members and said bar are rendered mutually captive, and means for applying tension to said bar to cause pressure to be transmitted through said tapered faces to said pressure members in order to exert pressure on opposed faces of said coils, said last means comprising a T-head on the end of said bar remote from said pressure members, an axial slot in said rotor for receiving said T-head, and wedging means insertable into said axial slot and co-operating with said T-head.

References Cited in the file of this patent

UNITED STATES PATENTS

| | | |
|---|---|---|
| 729,414 | Reist | May 26, 1903 |
| 992,548 | Dandliker | May 16, 1911 |
| 2,654,037 | Henter | Sept. 29, 1953 |